United States Patent
Wawda et al.

(10) Patent No.: US 8,260,711 B1
(45) Date of Patent: Sep. 4, 2012

(54) SYSTEMS AND METHODS FOR MANAGING RIGHTS OF DATA VIA DYNAMIC TAINT ANALYSIS

(75) Inventors: Abubakar Wawda, Los Angeles, CA (US); Michael Spertus, Wilmette, IL (US)

(73) Assignee: Symantec Corporation, Mountain View, CA (US)

( * ) Notice: Subject to any disclaimer, the term of this patent is extended or adjusted under 35 U.S.C. 154(b) by 739 days.

(21) Appl. No.: 12/327,447

(22) Filed: Dec. 3, 2008

(51) Int. Cl.
*G06Q 99/00* (2006.01)

(52) U.S. Cl. ............ 705/57; 705/58; 726/27; 726/32; 726/33

(58) Field of Classification Search .............. None
See application file for complete search history.

(56) References Cited

U.S. PATENT DOCUMENTS

| | | | | | |
|---|---|---|---|---|---|
| 5,260,999 | A | * | 11/1993 | Wyman ............... | 705/59 |
| 5,454,086 | A | * | 9/1995 | Alpert et al. ........ | 712/227 |
| 5,629,980 | A | * | 5/1997 | Stefik et al. ........ | 705/54 |
| 5,715,403 | A | * | 2/1998 | Stefik ................ | 705/44 |
| 5,765,152 | A | * | 6/1998 | Erickson ............ | 1/1 |
| 5,857,020 | A | * | 1/1999 | Peterson, Jr. ....... | 705/52 |
| 5,910,987 | A | * | 6/1999 | Ginter et al. ........ | 705/52 |
| 5,933,498 | A | * | 8/1999 | Schneck et al. ..... | 705/54 |
| 6,226,618 | B1 | * | 5/2001 | Downs et al. ....... | 705/51 |
| 6,389,541 | B1 | * | 5/2002 | Patterson .......... | 726/9 |
| 6,502,099 | B1 | * | 12/2002 | Rampy .............. | 1/1 |
| 6,823,460 | B1 | * | 11/2004 | Hollander et al. ... | 726/3 |
| 6,993,137 | B2 | * | 1/2006 | Fransdonk ......... | 380/279 |
| 7,594,111 | B2 | * | 9/2009 | Kiriansky et al. ... | 713/166 |
| 7,624,439 | B2 | * | 11/2009 | Koestler ............ | 726/16 |
| 7,877,781 | B2 | * | 1/2011 | Lim ................. | 726/1 |
| 7,913,092 | B1 | * | 3/2011 | Hiltunen et al. ..... | 713/187 |
| 8,127,316 | B1 | * | 2/2012 | Binotto et al. ...... | 719/331 |
| 8,151,109 | B2 | * | 4/2012 | Fanton et al. ....... | 713/165 |
| 2002/0006204 | A1 | * | 1/2002 | England et al. ..... | 380/269 |
| 2002/0082997 | A1 | * | 6/2002 | Kobata et al. ...... | 705/51 |
| 2004/0123129 | A1 | * | 6/2004 | Ginter et al. ....... | 713/193 |
| 2004/0194126 | A1 | * | 9/2004 | Kogure et al. ...... | 725/31 |
| 2005/0108562 | A1 | * | 5/2005 | Khazan et al. ..... | 713/200 |

OTHER PUBLICATIONS

Burton, "Elementary Number Theory," Fourth Edition, 1998, The McGraw-Hill Companies, Inc., all pages.*
Website: http.news.thomasnet.com/companystory/811648, *Autonomy ZANTAZ Announces Support of EDRM Program's New XML Standard for Electronic Discovery Process*, Oct. 23, 2007 (11 pgs.).
Website: http:www.cs.berkeley.edu/~daw/papers/fmtstr-plas07.pdf, Chen, Karl, et al., *Large-Scale Analysis of Format String Vulnerabilities in Debian Linux*, UC Berkeley, Jun. 14, 2007 (10 pgs.).
Website: http://www.cerias.purdue.edu/news_and_events/events/calendar/cerias_event.php?uid=n1j5uh5ggaie1155vplmtiomjs@google.com, Xu, Dongyan, *OS-Level Taint Analysis for Malware Investigation and Defense*, Purdue University, Nov. 29, 2006 (2 pgs.).
Website: http://linkinghub.elsevier.com/retrieve/pii/S138912860600243X, *SweetBait: Zero-hour worm detection and containment using low-and high-interaction honeypots*, Oct. 13, 2006 (4 pgs.).

(Continued)

*Primary Examiner* — Jacob C. Coppola
(74) *Attorney, Agent, or Firm* — Holland & Hart LLP (57) ABSTRACT

A method for managing rights associated with data is described. A request to access encrypted data is intercepted. Credentials associated with the request are verified. The data is decrypted if the credentials are verified. The decrypted data is marked with an identifier. Predetermined operations directed to the decrypted data are monitored.

13 Claims, 7 Drawing Sheets

OTHER PUBLICATIONS

Website: http://www.informatik.uni-hamburg.de/SVS/papers/2006_esorics_SessionSafe.pdf, Johns, Martin, *SessionSafe: Implementing XSS Immune Session Handling*, University of Hamburg, 2006 (17 pgs.).

Website: http://valgrind.org/docs/newsome2005.pdf, Newsome, James, et al., *Dynamic Taint Analysis for Automatic Detection, Analysis, and Signature Generation of Exploits on Commodity Software*, Carnegie Mellon University, 2005 (17 pgs.).

\* cited by examiner

SYSTEMS AND METHODS FOR MANAGING RIGHTS OF DATA VIA DYNAMIC TAINT ANALYSIS

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems are used to carry out several business, industry, and academic endeavors. For example, computer systems are used to complete transactions, store data, provide information, etc.

Data used by a computer system may be organized into a computer file. The data may be represented as a collection of binary digits that represent integer values, text characters, etc. A computer program (or application) may access a computer file, interpret the contents of the file, and present the contents to a user as more meaningful information (text, images, sounds, etc.).

Often times, data may be transferred from one location to another. For example, data may be transferred from one computer system to another. A user that controls the data on a first computer system may desire that access to the transferred data on a second computer system be restricted to other users that possess certain credentials. If a user does not possess the required credentials, the transferred data may not be accessed.

Application plug-ins have been developed to integrate with specific computer applications in order to control the access to data. However, developing and maintaining application specific plug-ins is an inefficient use of time and other resources. For example, each time an application is updated, the plug-ins that control access to data associated with the application must also be updated. In addition, plug-ins may not be developed for newly developed applications. As a result, managing the control to data associated with these newly developed applications may not be possible. As such, benefits may be realized by providing improved systems and methods for managing rights of data. In particular, benefits may be realized by providing improved systems and methods for managing rights of data via dynamic taint analysis.

SUMMARY

In one embodiment, a method for managing rights associated with data is described. A request to access encrypted data may be intercepted. Credentials associated with the request may be verified. The data may be decrypted if the credentials are verified. The decrypted data may be marked with an identifier. Predetermined operations directed to the decrypted data may be monitored.

In one embodiment, a monitored operation is allowed to be executed on the decrypted data. Data resulting from the execution of the allowed operation may be analyzed to determine if the resulting data should be marked with the identifier. The resulting data may be marked with the identifier based on the analysis of the resulting data. In one configuration, a monitored operation may be prevented from being executed on the decrypted data.

The monitored operations may include an instruction to print, transfer, or copy the decrypted data to another location. In one embodiment, marking the decrypted data with an identifier may include recording a location in memory corresponding to the decrypted data. Data-manipulation operations may be monitored prior to the decryption of the data. Operation locations identifying the occurrence of one or more data-manipulation operations may be recorded. Operations directed to manipulating decrypted data that are located in the recoded operation locations may be monitored.

A computer system that is configured to manage rights associated with data is also described. The computer system may include a processor and memory in electronic communication with the processor. The computer system may also include a rights-management module. The module may be configured to intercept a request to access encrypted data and verify credentials associated with the request. In addition, the module may be configured to decrypt the data if the credentials are verified and mark the decrypted data with an identifier. The module may be further configured to monitor predetermined operations directed to the decrypted data.

A computer-program product for managing rights associated with data is also described. The computer-program product may include a computer-readable medium having instructions thereon. The instructions may include code programmed to intercept a request to access encrypted data and code programmed to verify credentials associated with the request. The instructions may also include code programmed to decrypt the data if the credentials are verified, code programmed to mark the decrypted data with an identifier, and code programmed to monitor predetermined operations directed to the decrypted data.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Existing Enterprise Digital Right Management (eDRM) products provide access to protected data through application and file specific plug-ins. These eDRM products are implemented as follows. First, a recipient receives protected data through an email application, file share application, or some other means. The protected data may be encrypted and access to the data may be restricted to specific users, which may be specified by the creator/owner of the protected data. In addition, the owner of the protected data may also specify certain restrictions on the data. For example, the owner may allow the data to be accessed and viewed (by a user that has the proper credentials), but the owner may not allow the data to be printed or copied to a clipboard application.

In one embodiment, existing eDRM products may be plug-ins that integrate with specific applications. When an application attempts to access protected data, the eDRM plug-in may be accessed. The plug-in may verify the credentials of the user that is using the application, decrypts the data (if the credentials are verified), and applies any further restrictions to the data by interfacing with the application. For example, the plug-in may disable the "copy to clipboard" function, the "print" function, etc.

Current eDRM products only support applications (or file-types) that have some type of built-in eDRM functionality. In addition, eDRM products must be developed (and maintained) to constantly support new applications and updates to existing applications. As such, benefits may be realized by providing a generic solution to managing data rights that may be implemented regardless of the application or file-type.

Figure 1:
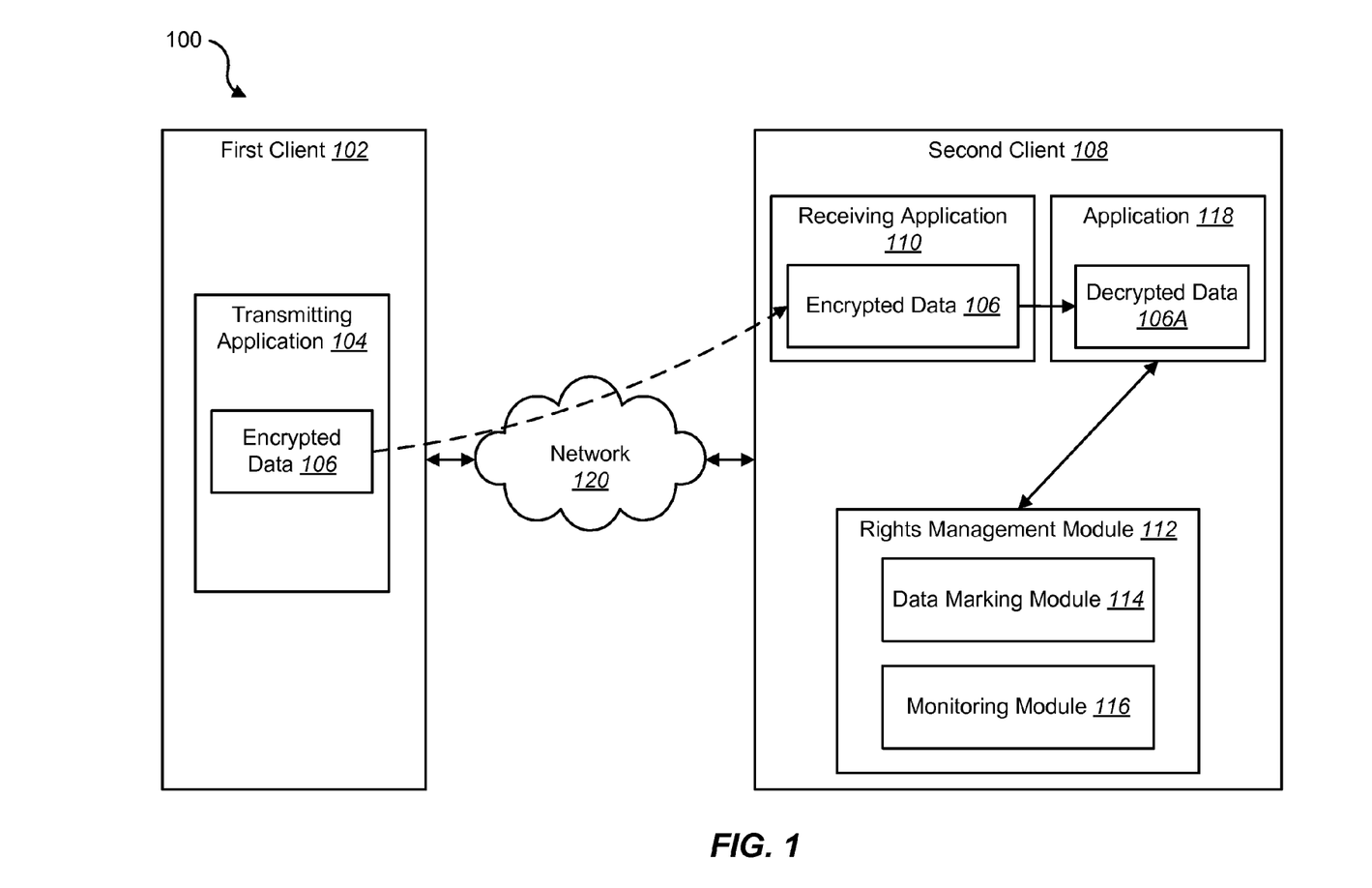
FIG. 1 is a block diagram illustrating one embodiment of a data rights management system in accordance with the present systems and methods.

FIG. 1 is a block diagram illustrating one embodiment of a data rights management system 100 in accordance with the present systems and methods. In one configuration, the system 100 may include a first client 102 communicating with a second client 108. The clients 102, 108 may be a computing device, such as a laptop, personal digital assistant (PDA), hand-held computer, desktop computer, super-computer, or any other type of computing device.

In one embodiment, the first client 102 may include a transmitting application 104 that transmits encrypted data 106 to the second client 108 over a network 120. The network 120 may include the Internet, a wide area network (WAN), a local area network (LAN), a wireless network, a wired network, or any other type of network. In one configuration, the transmitting application 104 may be an email application, a file-sharing application, etc.

A receiving application 110 on the second client 108 may receive the encrypted data 106 transmitted from the first client 102. The receiving application 110 may be an email application, a file-sharing application, etc. An application 118 on the second client 108 may access the encrypted data 106 from the receiving application 110. In one embodiment, the second client 108 may include a rights management module 112. For example, the rights management module 112 may implement Enterprise Digital Rights Management (eDRM) functions. The rights management module 112 may determine whether the encrypted data 106 should be decrypted into decrypted data 106A. In addition, the rights management module 112 may include a data marking module 114 and a monitoring module 116. The data marking module 114 may mark the decrypted data 106A and the monitoring module 116 may monitor instructions directed to the decrypted data 106A. More details concerning the rights management module 112 as described below.

Figure 2:
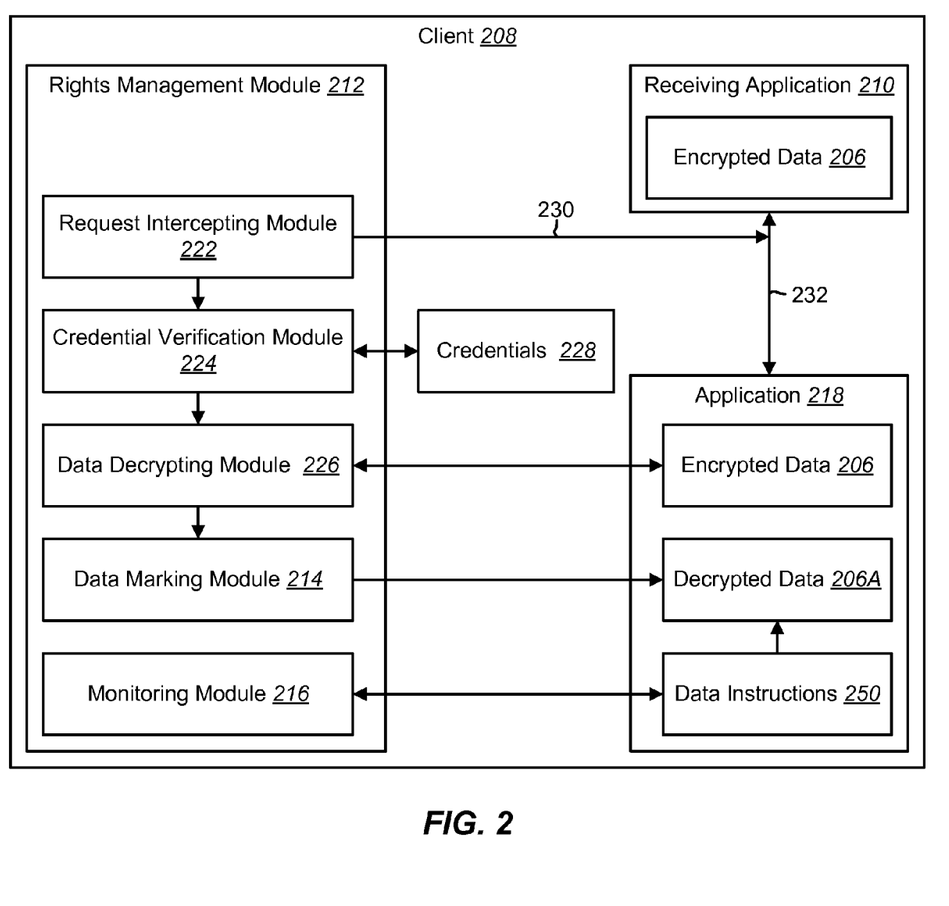
FIG. 2 is a block diagram illustrating one embodiment of a client including a rights management module.

FIG. 2 is a block diagram illustrating one embodiment of a client 208 including a rights management module 212. The client 208 may include a receiving application 210 that receives encrypted data 206 from a transmitting application on another client (not shown). In one embodiment, an application 218 on the client 208 may request 232 the encrypted data 206 from the receiving application 210. For example, the application 218 may communicate a "file-open" request 232 to the receiving application if the encrypted data 206 is a data file. The encrypted data 206 may be accessed by the application 218, but the data 206 may be unreadable by a user. The encrypted data 206 may be decrypted if certain credentials 228 of a user attempting to access the encrypted data 206 are verified.

In one embodiment, the rights management module 212 may include a request intercepting module 222 that intercepts 230 the data request 232. When a data request 232 is intercepted 230, a credential verification module 224 may verify the credentials 228 associated with a user of the client 208. For example, the credentials 228 may include the username and password associated with the user of the client 208.

If the credentials 228 are verified, a data decrypting module 226 may access the encrypted data 206 in order to decrypt the data 206. Before decrypted data 206A is returned to the application 218, a data marking module 214 may mark the decrypted data 206A. In one embodiment, the data marking module 214 may mark the data 206A by indicating the memory location of the decrypted data 206A. The application 218 may manipulate the decrypted data 206A through one or more data instructions 250. In one embodiment, a monitoring module 216 may monitor some or all of the data instructions 250 addressed to the decrypted data 206A that has been marked by the data marking module 214. The monitoring module 216 may determine whether or not the data instructions 250 should be executed on the decrypted data 206A.

Figure 3:
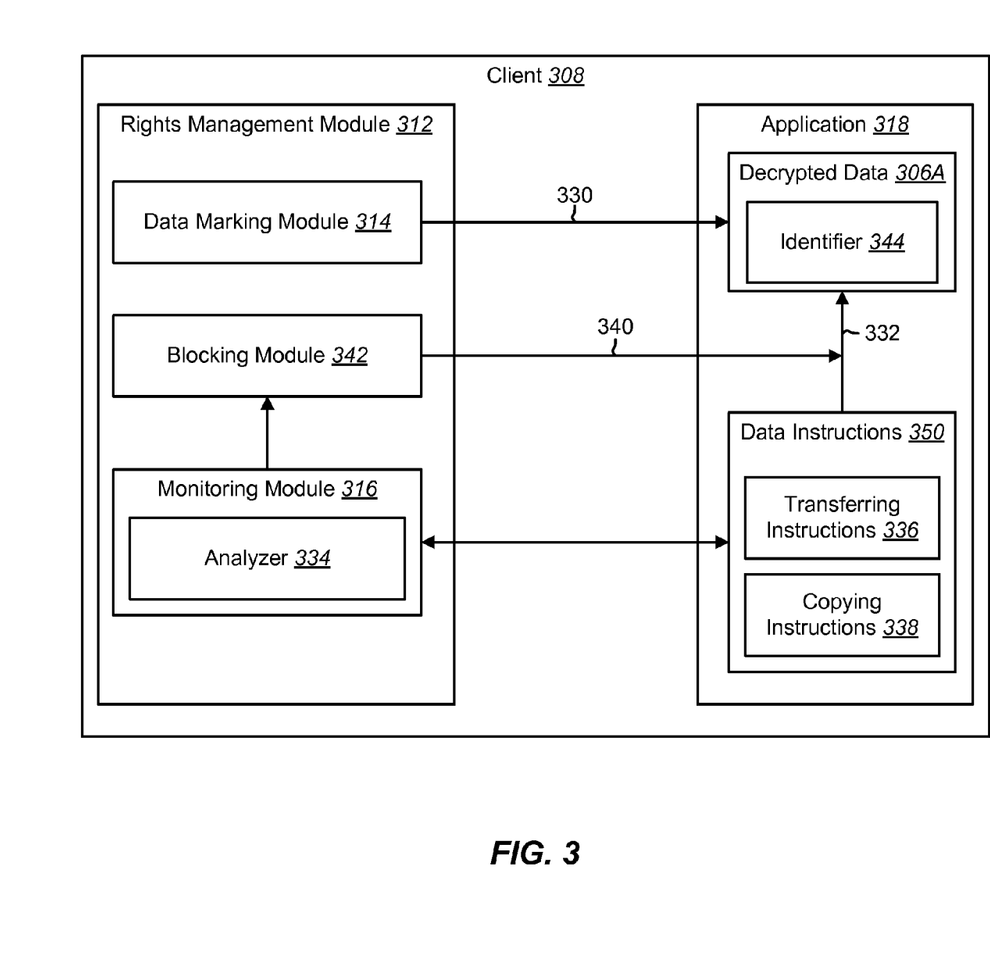
FIG. 3 is a block diagram illustrating a further embodiment of a rights management module.

FIG. 3 is a block diagram illustrating a further embodiment of a client 308 that includes a rights management module 312. As previously explained, a data marking module 314 may mark 330 decrypted data 306A with an identifier 344. In one embodiment, the decrypted data 306A may be copied to another location within the memory of the client 308 (not shown). Each copy of the original decrypted data 306A may also be marked with the identifier 344.

In one embodiment, data instructions 350 may be applied 332 to the decrypted data 306A. Examples of data instructions 350 may include transferring instructions 336, copying instructions 338, etc. A transferring instruction 336 may include an instruction to print the decrypted data 306A, transfer the data 306A to another application, etc. Copying instructions 338 may includes instructions to copy the data 306A to a clipboard, paste the data 306A within another application, etc.

A monitoring module 316 may monitor some or all of the data instructions 350 communicated 332 to the decrypted data 306A. An analyzer 334 may analyze the instructions 350 and determine whether the instructions 350 should be allowed on the decrypted data 306A. The analyzer 334 determine the instructions are allowed or not allowed based on the identifier 344 associated with the decrypted data 306A. If the analyzer 334 determines that the data instructions 350 are not allowed to be executed on the decrypted data 306A, a blocking module 342 may prevent 340 the communication 332 of the non-allowed data instructions 350. For example, the analyzer 334 may determine that copying the decrypted data 306A to a clipboard is a non-allowed instruction. The blocking module 342 may detect a hook for a clipboard application programming interface (API) and prevent the decrypted data 306A from being copied to a clipboard by disabling the hook. In one embodiment, the above mentioned functions of the monitoring module 316 may be applied on a per-data file basis. In other words, restrictions placed on a data file may only affect a single data file and not each and every data file in use by an application.

In some embodiments, a data file may be opened by an application, but in another process. In other words, protected data may be opened in different instances of the application. Because each protected data file is opened in a separate process, restrictions may be applied by the management module 312 on a per-process basis.

In one embodiment, the monitoring module 316 may monitor the data instructions 350 before a user accesses the decrypted data 306A via the application 318. The monitoring module 316 may record locations within the application 318 where data-manipulating instructions may occur. For example, the monitoring module 316 may record the locations of the various hooks in the application 318 that allow the data 306A to be copied to a clipboard, printed, or any other form of manipulation. When a user accesses the decrypted data 306A via the application 318, the monitoring module 316 may only monitor the instructions 350 associated with the recorded locations previously recorded. Reducing the number of instructions 350 monitored by the monitoring module 316 may increase the processing and run-time of the application 318.

Figure 4:
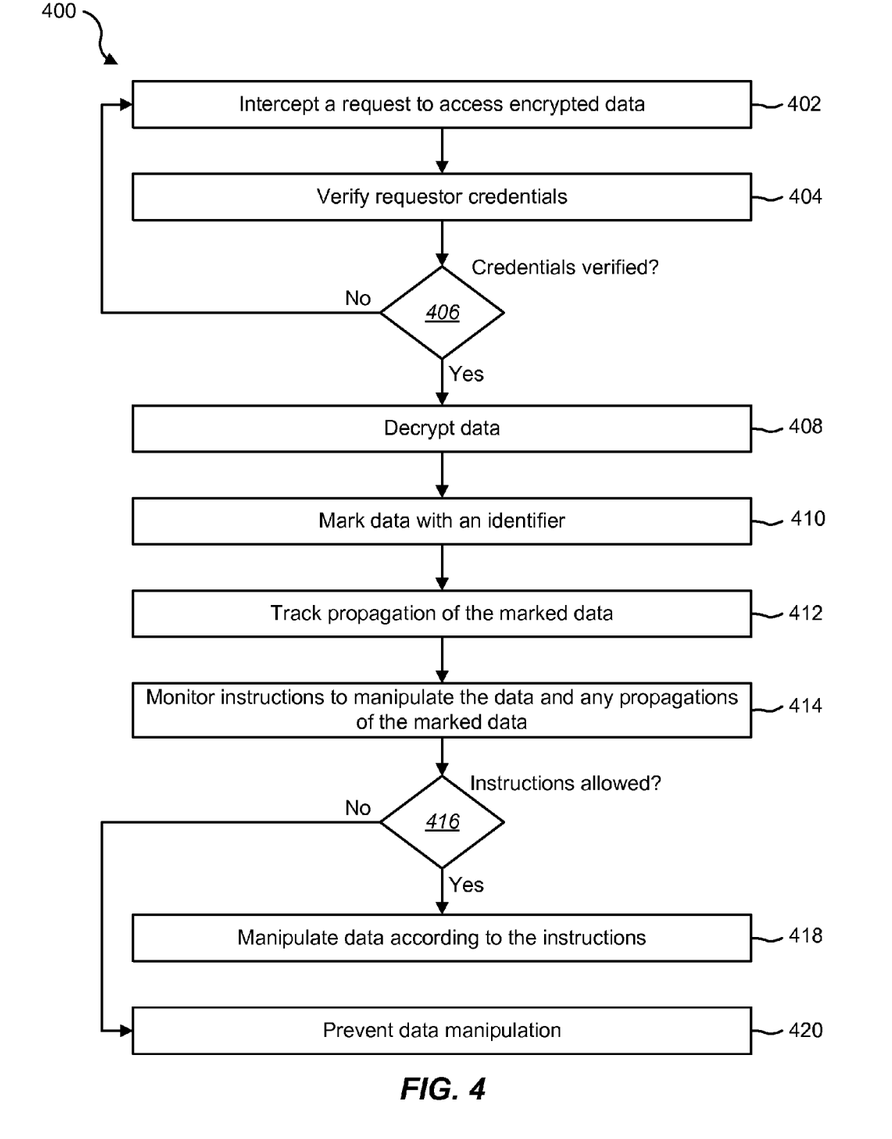
FIG. 4 is a flow diagram illustrating one embodiment of a method for implementing data rights management.

FIG. 4 is a flow diagram illustrating one embodiment of a method 400 for implementing data rights management. The method 400 may be implemented by rights management module 112 of FIG. 1, 2 or 3. In one embodiment, the management module 112 may implement eDRM functions as previously explained.

In one configuration, a request to access encrypted data may be intercepted 402. In one embodiment, the request intercepting module of FIG. 2 may intercept the request to access encrypted data. For example, a user of a first application (such as the application 118) may request encrypted data 106 from a second application (such as the receiving application 110). When the request is intercepted 402, credentials of the requestor may be verified 404. In one embodiment, the credentials may be associated with a user that desires to access the encrypted data. The credentials may include a username, password, IP address, name, etc. associated with the user.

In one embodiment, a determination 406 may be made as to whether the credentials are verified. In one example, the credential verification module 224 of FIG. 2 may determine 406 whether the credentials are verified or authenticated. If it is determined 406 that the credentials are not verified, the method 400 may remain idle until another request to access encrypted data is intercepted 402. However, if it is determined 406 that the credentials are verified, the data may be decrypted 408. For example, the data decrypting module 226 of FIG. 2 may decrypt the data. In addition, the data may be marked 410 with an identifier. In one embodiment, the data marking module 214 of FIG. 2 or 3. The decrypted data may then be returned to the application that originally requested the data. As previously mentioned, the data may be marked 410 by identifying the location in memory where the data is stored. In one example, the data marking module 214 of FIG. 2 or 3 may mark the data. In one configuration, propagations of the marked data may be tracked 412 as the application executes. For example, the original marked data may be copied and stored in another location in memory. These copies of the original marked data may be tracked 412 as propagations of the marked data.

Operations and/or instructions to manipulate the decrypted data, as well as any tracked propagations of the marked data, may be monitored 414. In one embodiment, only instructions that pertain to certain hook APIs are monitored (printing instructions, copying instructions, etc.) As previously explained, the location of the hook APIs may be previously determined and recorded in order to reduce the amount of instructions monitored 414. The monitoring module of FIG. 2 or 3 may record the location of the hook APIs to monitor.

A determination 416 may be made as to whether the monitored operations and/or instructions are allowed. For example, the monitoring module 116 may detect an instruction to print the data. The monitoring module 116 may determine 416 if the printing instruction is allowed for the decrypted data, or any propagations of the decrypted data. If the operation or instruction is not allowed, the instruction to manipulate (i.e., print, copy, paste, etc.) the data is prevented 420. In one embodiment, the blocking module 342 may prevent the instruction from manipulating the data. In one example, the blocking module 342 may intercept the non-allowed instructions before they are applied to the decrypted data. However, if it is determined 416 that the instruction is allowed, the instructions may be applied and the data may be manipulated 418 according to the allowed instructions.

Figure 5:
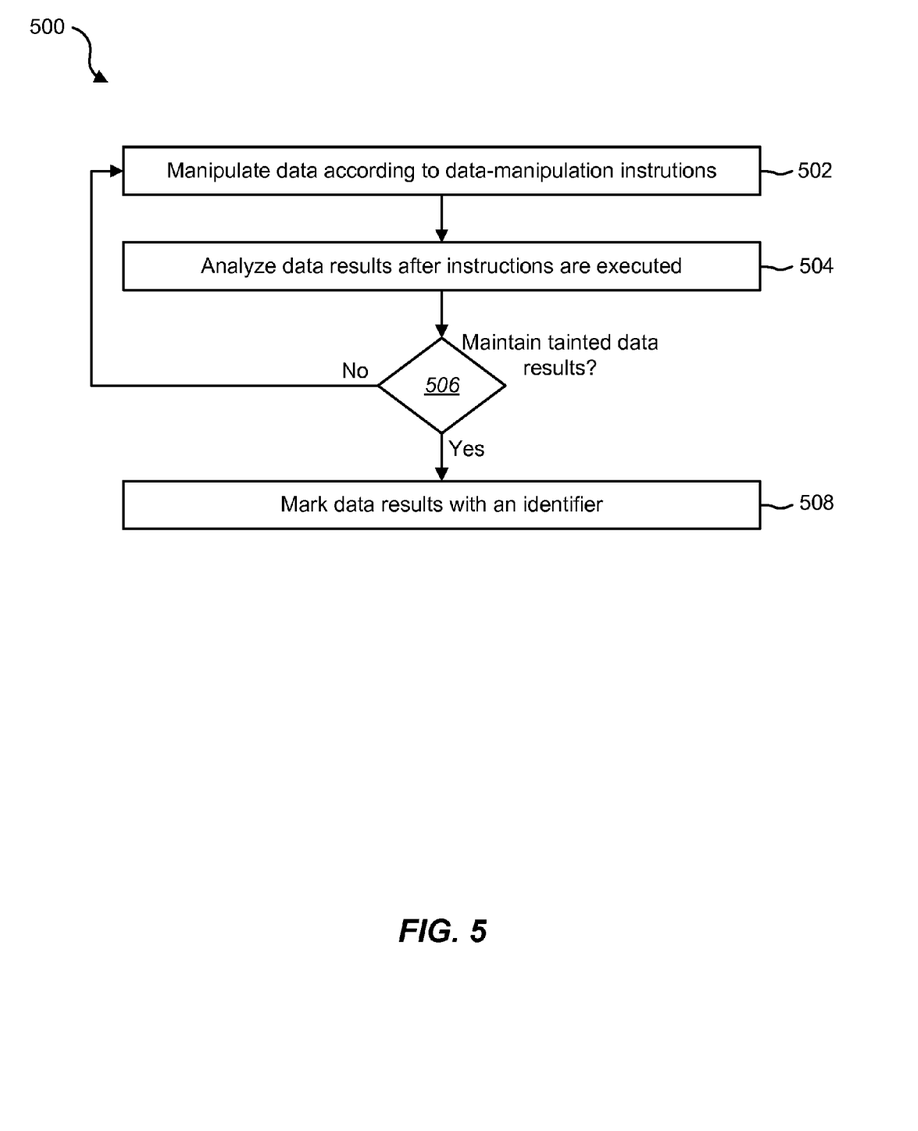
FIG. 5 is a flow diagram illustrating one embodiment of a method for determining if data remains tainted after the execution of data-manipulation instructions.

FIG. 5 is a flow diagram illustrating one embodiment of a method 500 for determining if data remains tainted after the execution of data-manipulation instructions. In one embodiment, decrypted data may be manipulated 502 according to data-manipulation instructions. The decrypted data my be marked (or tainted) as described above. The data may be manipulated if it is determined that the instructions are allowable instructions.

The data that results from the execution of the instructions may be analyzed 504. For example, the instructions may be to copy the original data to a clipboard application. The copy of the data on the clipboard may be analyzed 504. A determination 506 may be made as to whether the data results should be maintained as marked or tainted data. The determination 506 may be based on the analysis 504 of the data results. If the pre-instruction data is tainted, the post-instruction data may also maintain the taint. In other words, if the original decrypted data is tainted and then copied to a clipboard application, the copied data on the clipboard may also be marked 508 with an identifier in order to be tainted.

The method 500 may be repeated each time certain data-manipulation instructions are allowed and executed on data. Continuing with the example provided above, a printing instruction may be executed on the tainted data previously copied on the clipboard application. The printed data may be analyzed 504 to determine 506 if the printed data should also be maintained as tainted data.

Figure 6:
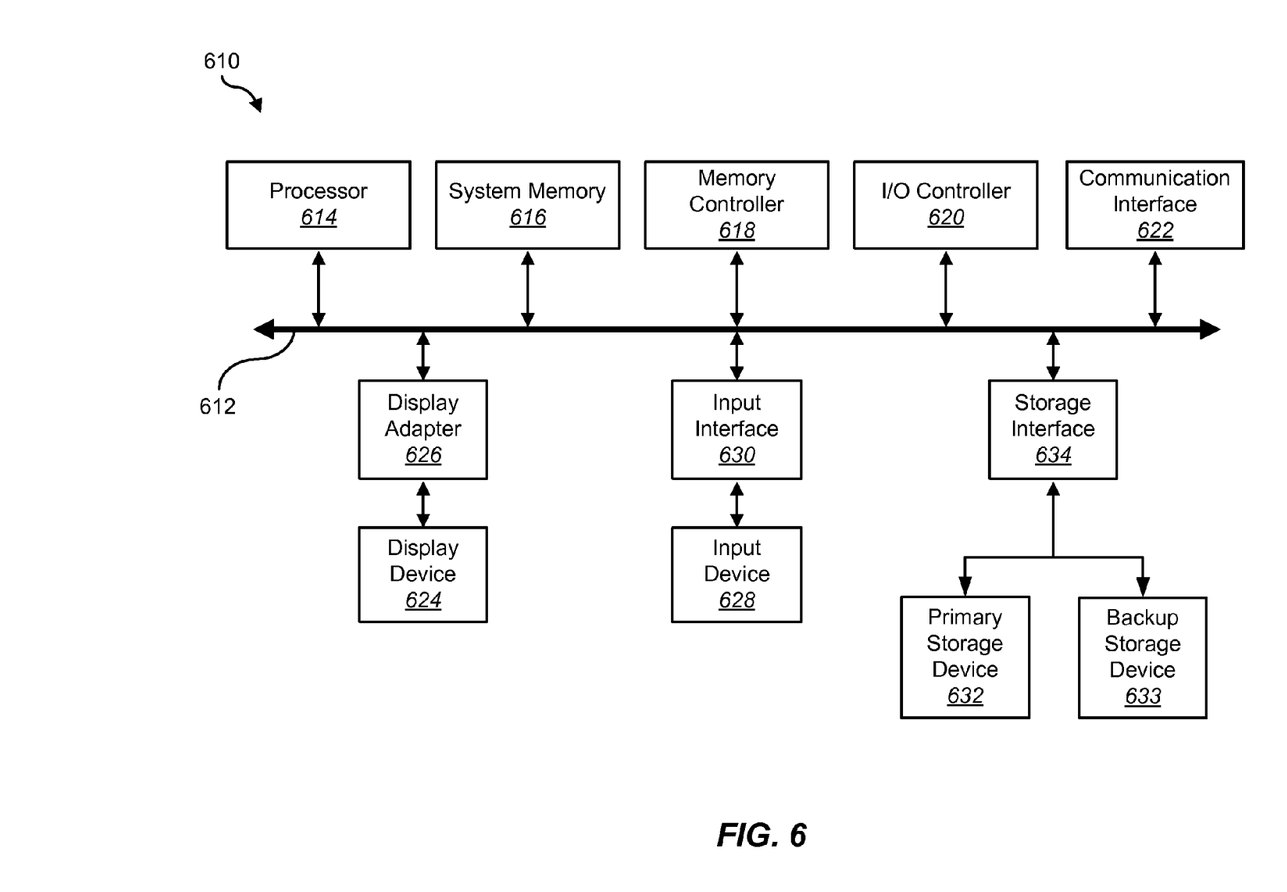
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may comprise at least one processor 614 and system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the intercepting, verifying, decrypting, marking, and monitoring steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may comprise both a volatile memory unit (such as, for example, system memory 616) and a non-volatile storage device (such as, for example, primary storage device 632, as described in detail below).

In certain embodiments, exemplary computing system 610 may also comprise one or more components or elements in addition to processor 614 and system memory 616. For example, as illustrated in FIG. 6 computing system 610 may comprise a memory controller 618, an I/O controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller 618 may perform and/or be a means for performing, either alone or in combination with other elements, one or more of the steps or features described and/or illustrated herein, such as intercepting, verifying, decrypting, marking, and monitoring.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for intercepting, verifying, decrypting, marking, and monitoring steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network comprising additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network or a wireless IEEE 802.11 network), a personal area network (such as a BLUETOOTH or IEEE Standard 802.15.1-2002 network), a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the intercepting, verifying, decrypting, marking, and monitoring steps disclosed herein. Communication interface 622 may also be used to perform and/or be a means for performing other steps and features set forth in the instant disclosure.

As illustrated in FIG. 6, computing system 610 may also comprise at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also comprise at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the intercepting, verifying, decrypting, marking, and monitoring steps disclosed herein. Input device 628 may also be used to perform and/or be a means for performing other steps and features set forth in the instant disclosure.

As illustrated in FIG. 6, exemplary computing system 610 may also comprise a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also comprise other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Storage devices 632 and 633 may also be used, for example, to perform and/or be a means for performing, either alone or in combination with other elements, one or more of the intercepting, verifying, decrypting, marking, and monitoring steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
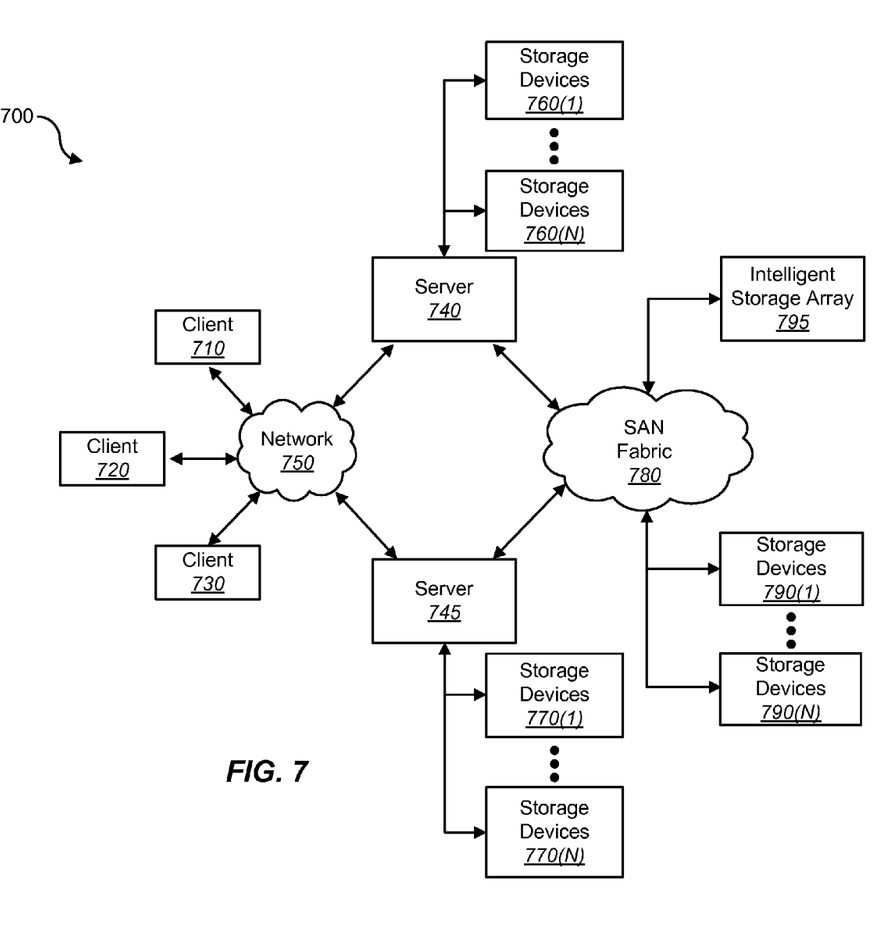
FIG. 7 is a block diagram of an exemplary network architecture in which client systems and servers may be coupled to a network.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or to run certain software applications. Network 750 generally represents any telecommunication or computer network; including, for example, an intranet, a wide area network (WAN), a local area network (LAN), a personal area network (PAN), or the Internet.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790 (1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing, either alone or in combination with other elements, one or more of the intercepting, verifying, decrypting, marking, and monitoring steps disclosed herein. Network architecture 700 may also be used to perform and/or be a means for performing other steps and features set forth in the instant disclosure.

As detailed above, computing system 610 and/or one or more of the components of network architecture 700 may perform and/or be a means for performing, either alone or in combination with other elements, one or more steps of the exemplary methods described and/or illustrated herein. For example, computing system 610 and/or one or more of the components of network architecture 700 may perform and/or be a means for performing a computer-implemented method for managing rights associated with data that may comprise: 1) intercepting a request to access encrypted data, 2) verifying credentials associated with the request, 3) decrypting the data if the credentials are verified, 4) marking the decrypted data with an identifier, and 5) monitoring predetermined instructions directed to the decrypted data.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A method for managing rights associated with data, the method comprising:
   intercepting, by a hardware processor, a request to access encrypted data;
   verifying, by the hardware processor, credentials associated with the request to determine whether the credentials are authenticated;
   decrypting, by the hardware processor, the data if the credentials are determined to be authenticated;
   marking, by the hardware processor, the decrypted data with an identifier;
   recording, by the hardware processor, a location of at least one application programming interface (API) hook to monitor;
   monitoring, by the hardware processor, the recorded location of the at least one API hook for operations directed to the decrypted data;
   executing, by the hardware processor, one of the monitored operations on the decrypted data; and
   marking, by the hardware processor, data resulting from the execution of the operation with the identifier.

2. The method of claim 1, further comprising preventing a monitored operation from being executed on the decrypted data.

3. The method of claim 1, wherein the monitored operations comprise an instruction to print, transfer, or copy the decrypted data to another location.

4. The method of claim 1, wherein marking the decrypted data with an identifier further comprises recording a location in memory corresponding to the decrypted data.

5. The method of claim 1, further comprising monitoring data-manipulation operations prior to the decryption of the data.

6. The method of claim 5, further comprising recording operation locations identifying the occurrence of one or more data-manipulation operations.

7. The method of claim 6, further comprising monitoring operations directed to manipulating decrypted data that are located in the recoded operation locations.

8. A computer system that is configured to manage rights associated with data, the computer system comprising:
   a processor; and
   a memory storing computer executable instructions that, when executed by the processor, cause the processor to perform the steps of:
      intercepting a request to access encrypted data;
      verifying credentials associated with the request to determine whether the credentials are authenticated;
      decrypting the data if the credentials are determined to be authenticated;
      marking the decrypted data with an identifier;
      recording a location of at least one application programming interface (API) hook to monitor and monitoring the recorded location of the at least one API hook for operations directed to the decrypted data;
      executing one of the monitored operations on the decrypted data; and
      marking data resulting from the execution of the operation with the identifier.

9. The computer system of claim 8, wherein the processor further performs the step of preventing a monitored operation from being executed on the decrypted data.

10. The computer system of claim 8, wherein the monitored operations comprise an instruction to print, transfer, or copy the decrypted data to another location.

11. The computer system of claim 8, wherein the processor further performs the step of marking the decrypted data with an identifier by recording a location in memory corresponding to the decrypted data.

12. The computer system of claim 8, wherein the processor further performs the steps of monitoring data-manipulation operations prior to the decryption of the data, recording operation locations identifying the occurrence of one or more data-manipulation operations, and monitoring operations directed to manipulating decrypted data that are located in the recoded operation locations.

13. A computer-program product for managing rights associated with data, the computer-program product comprising a non-transitory computer-readable storage medium storing computer executable instructions that, when executed by a processor, cause the processor to perform the steps of:
    intercepting a request to access encrypted data;
    verifying credentials associated with the request to determine whether the credentials are authenticated;
    decrypting the data if the credentials are determined to be authenticated;
    marking the decrypted data with an identifier;
    recording a location of at least one application programming interface (API) hook to monitor;
    monitoring the recorded location of the at least one API hook for operations directed to the decrypted data;
    executing one of the monitored operations on the decrypted data; and
    marking data resulting from the execution of the operation with the identifier.

\* \* \* \* \*